Oct. 17, 1933.  W. L. PAUL  1,931,117

TRANSPORT DEVICE FOR TRACTORS

Filed June 13, 1931  3 Sheets-Sheet 1

WITNESS
Walter Ackerman

INVENTOR.
WILLIAM L. PAUL.
BY
W. C. Jardinston
ATTORNEY.

Oct. 17, 1933.  W. L. PAUL  1,931,117
TRANSPORT DEVICE FOR TRACTORS
Filed June 13, 1931  3 Sheets-Sheet 3
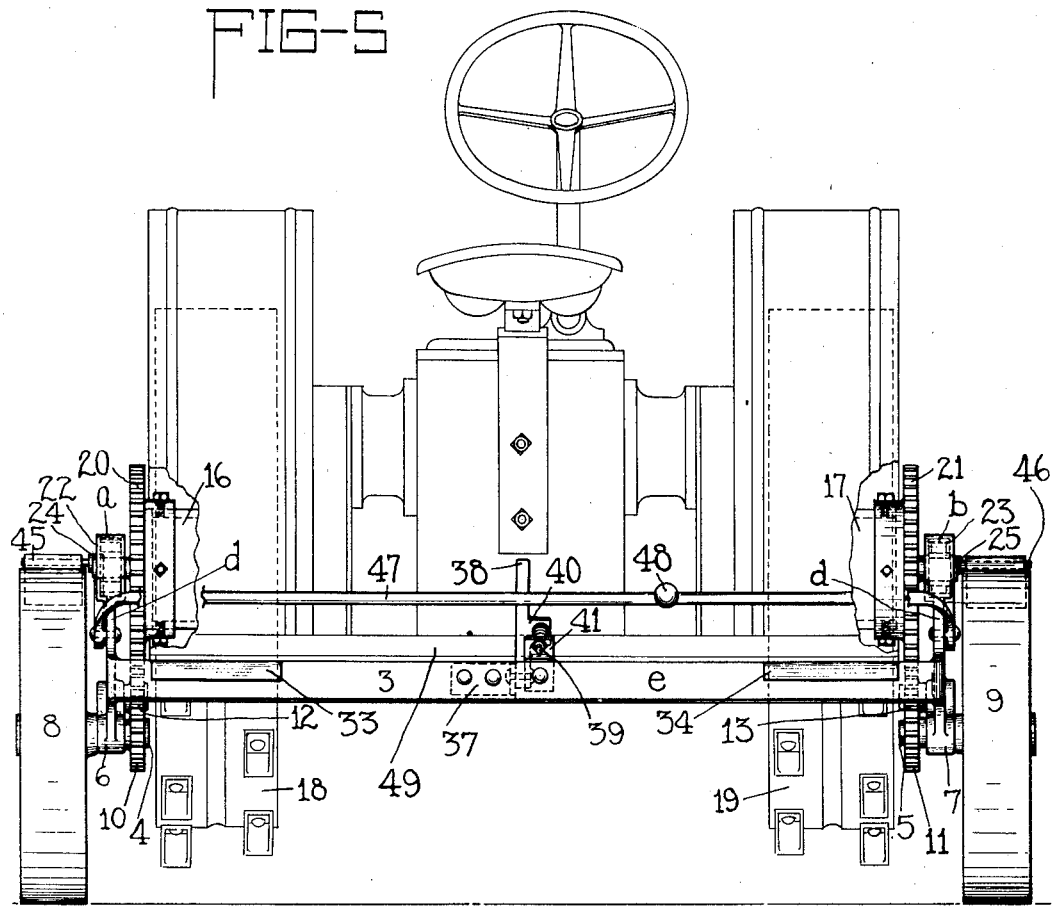
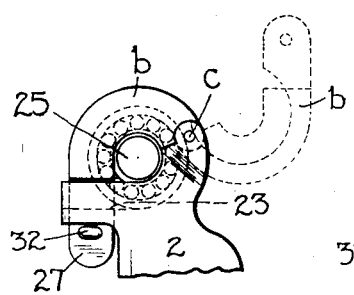
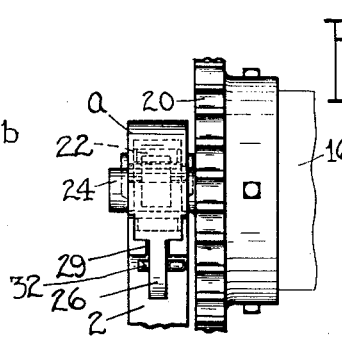
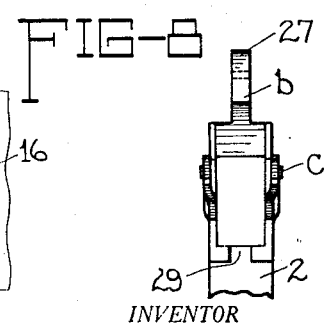
INVENTOR
WILLIAM L. PAUL.
BY
ATTORNEY
WITNESS
Walter Ackerman Patented Oct. 17, 1933

1,931,117

UNITED STATES PATENT OFFICE 1,931,117

TRANSPORT DEVICE FOR TRACTORS

William L. Paul, Berkeley, Calif., assignor to Deere & Company, Moline, Ill., a corporation of Illinois Application June 13, 1931. Serial No. 544,239

10 Claims. (Cl. 180—16)

My invention relates to tractors and has for its object employment of an effective mechanism complete in itself and readily attachable to a tractor and operative to raise the rear of the tractor by the motive power thereof so that the traction wheels will be raised from the ground in a manner hereinafter fully explained.

A further object of my invention is to provide a transport device which can be quickly attached to a tractor to raise and support the rear of a tractor and the rear wheels thereof so as to prevent damage to a road surface while traveling thereover.

With the rapid development of power driven vehicles arose a constantly increasing demand for improved roads presenting a smooth surface possessing strength and durability capable of sustaining the legalized weights and the wear incident to an ever increasing traffic. Naturally the problem of upkeep was the important consideration whether the roads were hard surfaced, or faced with a softer material, or heavily rolled. It was quickly discovered that indiscriminate use of the improved highways by vehicles having other than rubber tires damaged such highways to such an extent that the expense of maintenance was materially increased. Vehicles having metal tires, particularly of that type using lugs on the tread surface of the wheels, were most objectionable and regulations were issued forbidding the travel of such vehicles over an improved highway, unless the lugs were first removed, soon became effective.

The use of lugs on tractor wheels, particularly for agricultural purposes, is a necessity, yet it is frequently desirable to move a tractor from one locality to another connected by improved highways, and to remove the lugs before the tractor begins its travel and to replace them when the destination is reached requires considerable labor and results in loss of time, consequently in order to make it possible for a tractor to travel over an improved highway without removing the lugs, I have invented a transport device adapted to be attached to a tractor to lift the rear end, and the traction wheels thereon, above the surface of the highway, or other surface which might be damaged by lugs, so that the passage from one place to another can be made without infraction of the road regulations, the device being readily removed from the tractor when the destination of the latter has been reached.

Referring to the drawings in which similar numerals indicate identical parts—

Figure 5 is a rear view of Figure 1;

Figure 6 is an enlarged detail rear view of part of the gearing and a bearing for the tractor axle;

Figure 7 is a detail section on the line 7—7 of Figure 6; and,

Figure 8 is an open rear view of Figure 7 with the roller bearing omitted.

Figure 1:
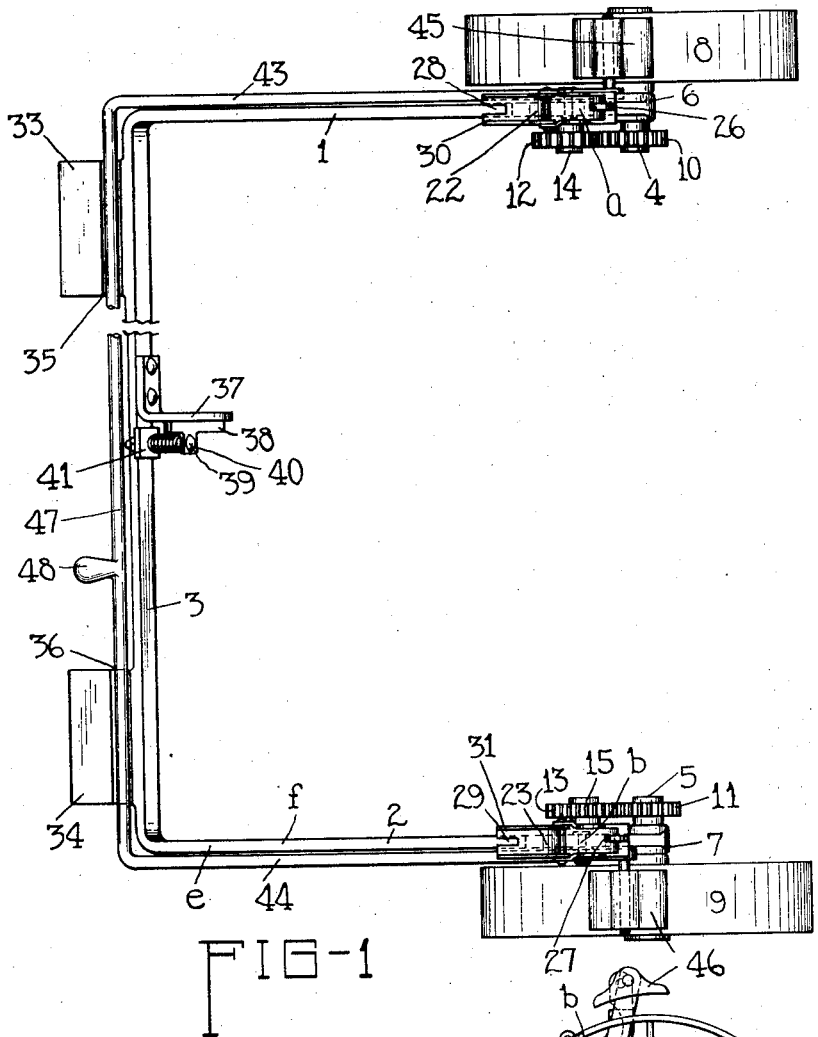
Figure 1 is a plan view of my device detached from a tractor.

The frame e upon which the various parts of my device are assembled is composed of side bars 1 and 2 connected by a transverse bar 3. Stub axles 4 and 5 are journaled in bearings 6 and 7 on the forward ends of the side bars 1 and 2, respectively. Wheels 8 and 9 are rigidly secured on the outer ends of the stub axles, and on the inner ends thereof are mounted pinions 10 and 11 meshing with similar pinions 12 and 13 on spindles 14 and 15 secured on the forward ends of the side bars 1 and 2. Sufficient of a tractor has been shown in fine lines to illustrate the use of my invention, but showing in full lines, and mounted on the hubs 16 and 17 of the tractor wheels 18 and 19, gears 20 and 21 which are adapted to mesh with the pinions 12 and 13 when my device is in use.

Figure 2:
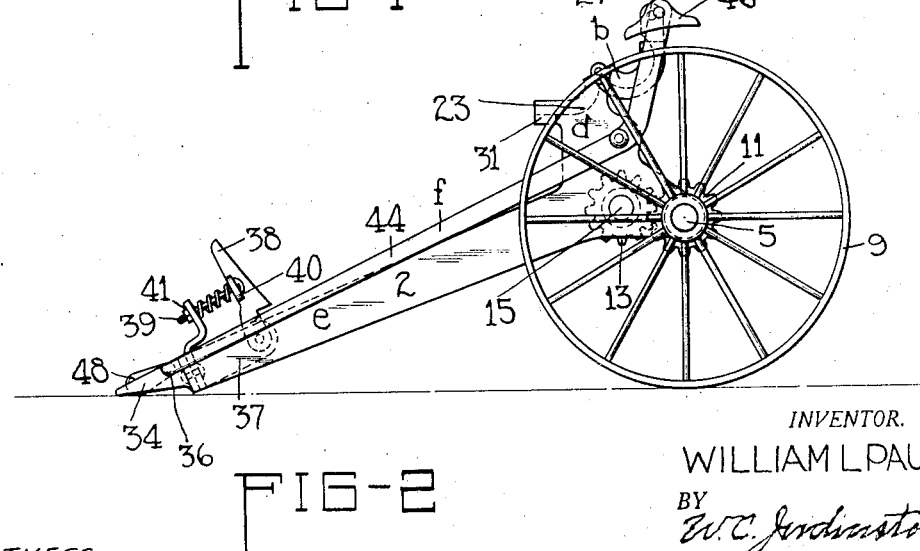
Figure 2 is a side elevation of Figure 1.
Figure 4:
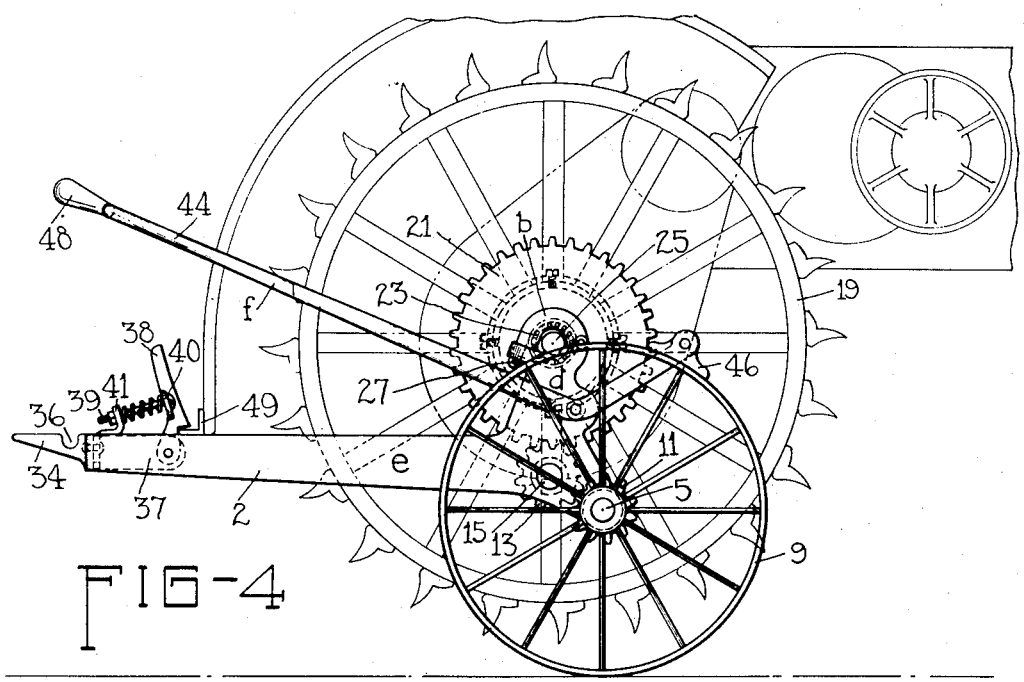
Figure 4 is a side view of my device illustrating its application to a tractor and the rear of the latter and the tractor wheels raised.

On upward extensions d of the side bars 1 and 2 are divided bearings 22 and 23 in which the axles 24 and 25 of the tractor wheels are to be received and supported; the upper halves a and b of the bearings are pivoted to the lower and normally are swung to an open position to admit the axles 24 and 25, as shown in full lines in Figures 1 and 2, and in dotted lines in Figure 7. The halves a and b are provided with tongues 26 and 27 which fit in open slots 28 and 29 in rearward projections 30 and 31 on the lower halves of the bearings. Pins or bolts 32 in the tongue hold the parts of the bearings together when closed. On the rear side of the transverse bar 3 and adjacent the ends thereof, and secured to the bar in any suitable manner, are flat members 33 and 34 extending rearwardly with their upper surfaces in alinement with upper edges of the bars 1 and 2 and having grooves 35 and 36 parallel with the bar 3. These members rest upon the ground or floor and are for the purpose of protecting the transverse bar as will be later disclosed. Mounted centrally on the transverse bar 3 is a bracket 37 on which is pivotally secured a dog 38; a bolt 39 extends through a projection 40 on the dog 38 and a bracket 41 on the bar 3 and is secured in place by a nut. A coiled spring 42 is on the bolt 39 between the brackets and operates to hold the dog 38 in operative position.

A brake frame f is composed of brake beams 43 and 44, parallel with the side bars 1 and 2, are pivotally mounted, intermediate their centers and forward ends, on the upward extension d of the bars 1 and 2, and from their pivots are bent upwardly to extend above the wheels 8 and 9 on which are pivotally mounted brake shoes 45 and 46. The brake beams are connected by a bar 47, parallel with the bar 3, and is provided with a handle 48.

The operation of my invention is as follows: My device is supposed to be close to a paved road, over which it is intended to transport the tractor, and positioned as shown in Figure 1. The tractor under its own power is driven over the bar 3, the wheels passing over on the members 33 and 34. With the forward motion of the tractor the axles 24 and 25 enter the bearings 22 and 23 after which the tractor is thrown out of gear and the parts a and b of the bearings, previously swung back on their pivots as shown in Figures 2 and 7, are closed over the axles and secured thereover by the pins or bolts 32. The gear 20 and the pinions 11 and 13 are now in mesh, the operator then raises the brake beams 43 and 44, by the handle 48, and clamps the brake shoes firmly against the tread of the wheels 8 and 9 so that the wheels, the gear and pinions are locked firmly against rotation relative to the tractor wheels. At this time the tractor is thrown into gear, and as the brake is still applied to the transport wheels, the power of the motor rocks the frame e imparting a forwardly upward movement to the rear of the tractor and the traction wheels 18 and 19 until the latter are free from contact with the ground, the tractor wheels, frame 2, wheels 8 and 9, and the gears and pinions associated therewith rotating as a unit relative to the tractor body. In this operation the rear of the frame e rises until the dog 38 engages with a bar 49 on the rear of the tractor. To accomplish this movement the axis of the wheels 18 and 19 is rearward of the axis of the wheels 8 and 9 permanently as clearly shown in the drawings.

Figure 3:
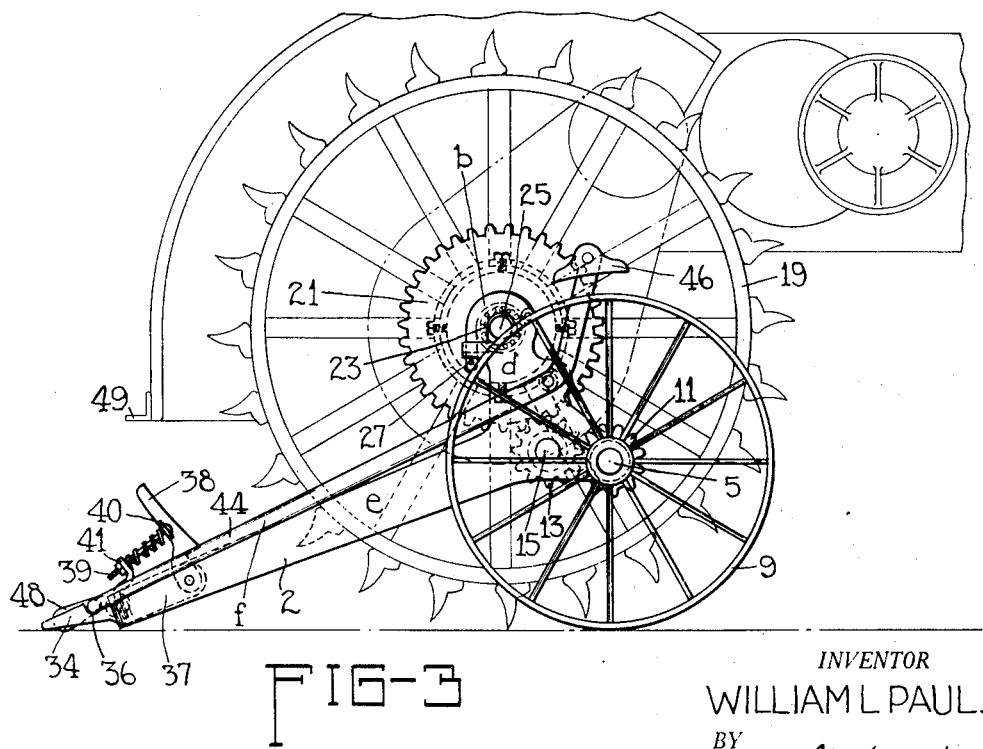
Figure 3 is a side view, similar to Figure 1, showing the device when first attached to a tractor.

Upon releasing the brake shoes 45 and 46 from the wheels 8 and 9, by lowering the brake frame f, said wheels are free to rotate, power to actuate them being received from the engine and transmitted through the gears 18 and 19, the pinions 12 and 13 and the pinions 10 and 11. When the brake frame is returned to its position of disuse the transverse part 47 thereof rests in the grooves 35 and 36 in the members 33 and 34 to escape injury from the wheels 18 and 19 when they pass over it. To remove my device from the tractor I disengage the dog 38 from the bar 49, and as the weight of the rear of the tractor is supported rearwardly of the axis of the wheels 8 and 9 the frame e will be rocked on its pivotal support on the axles 4 and 5 until the rear of the frame and the tractor wheels will rest on the ground as shown in Fig. 3; the pin 32 is then removed and after the upper parts a and b of the bearings 22 and 23 are raised, as shown in dotted lines in Figures 2 and 7, the tractor can be readily backed out of the device.

As shown in the drawings I have employed roller bearings, on the axles of the tractor wheels, and have provided grooves in the bearings for their reception when my device is employed.

What I claim is:—

1. The combination with a tractor having a power plant and traction wheels and driving connections therebetween, of a transport device including a frame and supporting wheels, means on the frame for supporting the rear of the tractor with the traction wheels out of contact with the ground, driving connections between the traction wheels of the tractor and the transport wheels, and means on said frame for locking said transport wheels against rotation relative to the traction wheels of the tractor whereby the traction wheels and transport wheels will be rotated as a unit when power from the tractor motor is applied to the traction wheels.

2. A transport device for tractors comprising a U-shaped frame having a pair of arms, a transport wheel journaled on the end of each arm, a bearing on the end of each arm adapted to support the hub of one of the rear wheels of a tractor or extension thereof, a pair of driving gears adapted to be bolted to the rear wheels of a tractor respectively, and concentric with the axis thereof, a gear fixed to each transport wheel concentric with the axis thereof, an idler gear journaled on the end of each arm meshing with the gear fixed to the transport wheel and positioned to mesh with said driving gears when the latter are bolted to the rear wheels of a tractor and the hubs of the rear wheels of the tractor or extensions thereof are positioned in said bearings.

3. The combination with a tractor having a pair of traction wheels driven by the motor of the tractor, of a transport device comprising a frame, bearings on said frame, axles journaled in said bearings and detachably fixed to the traction wheels of the tractor concentric with the axis thereof, transport wheels journaled on said frame, driving connections between the traction wheels of the tractor and said transport wheels, and means for locking said frame to the body of the tractor.

4. The combination with a tractor having a pair of traction wheels driven by the motor of the tractor, of a transport device comprising a frame, bearings on said frame, axles journaled in said bearings and detachably fixed to the traction wheels of the tractor concentric with the axis thereof, transport wheels journaled on said frame, driving connections between the traction wheels of the tractor and said transport wheels, means for locking said frame to the body of the tractor, and means operative at will for locking said transport wheels against turning relative to said traction wheels.

5. The combination with a tractor, of a transport device therefor having a frame and a pair of wheels, means on the frame to receive and support the rear axle or axles of the tractor, means operatively connecting the rear wheels of the tractor with the wheels of the transport device, means operable to lock the wheels of the transport device against rotation relative to the rear wheels of the tractor whereby the transport device with its wheels will be rotated as a unit with the rear wheels of the tractor when power from the power plant of the tractor is applied to the latter wheels.

6. The combination with a tractor, of a transport device therefor having a frame and a pair of wheels, means on the frame to receive and support the rear axle or axles of the tractor, means operatively connecting the rear wheels of the tractor with the wheels of the transport device, means operable to lock the wheels of the transport device against rotation relative to the rear wheels of the tractor whereby the transport device with its wheels will be rotated as a unit with the rear wheels of the tractor when power from the power plant of the tractor is applied to the latter wheels, and means to lock said frame to the tractor when it has been rotated to a certain position relative thereto.

7. The combination with a tractor, of a transport device therefor having a frame and a pair of wheels, bearings on the frame to receive and support the rear axle or axles of the tractor, the radius of the transport wheels plus the distance between said bearings and the center of the transport wheels being greater than the radius of the rear wheels of the tractor, means operable to lock the transport wheels against rotation relative to the rear wheels of the tractor whereby the rear wheels of the tractor will be raised from contact with the ground upon rotation of the tractor wheels through the power of the tractor motor.

8. The combination with a tractor, of a transport device therefor having a frame and a pair of wheels, bearings on the frame to receive and support the rear axle or axles of the tractor, the radius of the transport wheels plus the distance between said bearings and the center of the transport wheels being greater than the radius of the rear wheels of the tractor, means operable to lock the transport wheels against rotation relative to the rear wheels of the tractor whereby the rear wheels of the tractor will be raised from contact with the ground upon rotation of the tractor wheels through the power of the tractor motor and the transport frame will be rotated relative to the tractor body, and means for locking the transport frame to the tractor body when the rear wheels of the tractor are raised.

9. The combination with a tractor, of a transport device therefor having a frame and a pair of wheels, bearings on the frame to receive and support the rear axle or axles of the tractor, the radius of the transport wheels plus the distance between said bearings and the center of the transport wheels being greater than the radius of the rear wheels of the tractor, means operable to lock the transport wheels against rotation relative to the rear wheels of the tractor whereby the rear wheels of the tractor will be raised from contact with the ground upon rotation of the tractor wheels through the power of the tractor motor and the transport frame will be rotated relative to the tractor body, means for locking the transport frame to the tractor body when the rear wheels of the tractor are raised, and a driving connection between the rear tractor wheels and the transport wheels whereby the transport wheels may be rotated from power derived from the tractor motor to propel the tractor with the rear tractor wheels in a raised position upon the unlocking of the transport wheels to render them capable of rotation relative to the rear wheels of the tractor.

10. The combination with a tractor having a power plant and traction wheels and driving connections therebetween, of a transport device including a frame and supporting wheels, means on the frame for supporting the rear of the tractor with the traction wheels out of contact with the ground, driving connections between the traction wheels of the tractor and the transport wheels, each connection including a gear fixed to the traction wheel, a gear fixed to the transport wheel, an intermediate gear rotatively mounted on said frame and intermeshing with both of the other gears, and means for locking said transport wheels against rotation relative to the traction wheels of the tractor whereby the two will be rotated as a unit when power from the tractor motor is applied to the tractor wheels.

WILLIAM L. PAUL.